(12) United States Patent
Perez Jacome (10) Patent No.: US 10,371,564 B2
(45) Date of Patent: Aug. 6, 2019

(54) FORCE LOCATION APPARATUS, SYSTEMS, AND METHODS

(71) Applicant: Jorge Eduardo Perez Jacome, Lawrenceville, GA (US)

(72) Inventor: Jorge Eduardo Perez Jacome, Lawrenceville, GA (US)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 14/699,438

(22) Filed: Apr. 29, 2015

(65) Prior Publication Data

US 2016/0342969 A1 Nov. 24, 2016

(51) Int. Cl.
G06Q 20/00 (2012.01)
G01G 19/414 (2006.01)
G01M 1/12 (2006.01)
G01G 19/415 (2006.01)

(52) U.S. Cl.
CPC ....... *G01G 19/4144* (2013.01); *G01G 19/415* (2013.01); *G01M 1/122* (2013.01)

(58) Field of Classification Search
CPC .. G06Q 20/202; G06Q 20/208; G01G 19/414; G01G 19/415; G01G 19/4144; G01M 1/122; B65G 43/08; B65G 15/00
USPC .................................................. 705/16, 21
See application file for complete search history.

(56) References Cited

U.S. PATENT DOCUMENTS

| | | | | |
|---|---|---|---|---|
| 3,879,920 A | * | 4/1975 | Langen | B65B 11/004 53/207 |
| 4,574,939 A | * | 3/1986 | Dubuit | B65G 47/24 198/396 |
| 4,676,343 A | * | 6/1987 | Humble | A47F 9/047 177/50 |
| 5,497,314 A | * | 3/1996 | Novak | A47F 9/046 235/383 |
| 5,508,774 A | * | 4/1996 | Klees | G03B 17/38 348/E7.09 |
| 9,412,099 B1 | * | 8/2016 | Tyree | G06Q 20/12 |
| 2003/0047387 A1 | * | 3/2003 | Bogat | A47F 9/047 186/59 |
| 2003/0217892 A1 | * | 11/2003 | Persky | A47F 9/048 186/68 |
| 2004/0129463 A1 | * | 7/2004 | Carlucci | G01G 19/44 177/262 |
| 2004/0148089 A1 | * | 7/2004 | Schmidt | G06F 3/0414 701/124 |
| 2005/0284313 A1 | * | 12/2005 | Louviere | B41F 17/001 101/35 |
| 2007/0050271 A1 | * | 3/2007 | Ufford | G06Q 10/087 705/28 |
| 2008/0223941 A1 | * | 9/2008 | Mrowiec | A61B 5/00 235/494 |
| 2009/0060259 A1 | * | 3/2009 | Goncalves | A47F 9/047 382/100 |

(Continued)

*Primary Examiner* — Rokib Masud
(74) *Attorney, Agent, or Firm* — Schwegman, Lundberg & Woessner (57) ABSTRACT

Various embodiments of apparatus, systems, and methods operate to receive measurements corresponding to a plurality of forces sensed substantially simultaneously at a substantially planar, weight-bearing measurement surface. Additional activity includes determining a location on the surface, based on a combination of the measurements, of an equivalent force that corresponds to the combination of the measurements. Additional apparatus, systems, and methods are disclosed.

19 Claims, 5 Drawing Sheets

(56) References Cited

U.S. PATENT DOCUMENTS

| | | | |
|---|---|---|---|
| 2009/0134221 A1* | 5/2009 | Zhu | A47F 9/046 235/383 |
| 2009/0160975 A1* | 6/2009 | Kwan | H04N 5/77 348/231.99 |
| 2010/0206951 A1* | 8/2010 | Herwig | G01G 19/4144 235/439 |
| 2010/0217678 A1* | 8/2010 | Goncalves | G06Q 20/203 705/22 |
| 2012/0055982 A1* | 3/2012 | Edwards | G01G 19/4144 235/375 |
| 2013/0234949 A1* | 9/2013 | Chornenky | G06F 3/0216 345/169 |
| 2014/0052555 A1* | 2/2014 | MacIntosh | G06Q 20/208 705/23 |
| 2014/0062933 A1* | 3/2014 | Coulson | G06F 3/044 345/174 |
| 2014/0090902 A1* | 4/2014 | Wittenberg | G01G 19/4144 177/1 |
| 2014/0124272 A1* | 5/2014 | Siegel | G01G 19/445 177/1 |
| 2014/0129362 A1* | 5/2014 | Marquis | G07G 1/0036 705/23 |
| 2014/0367466 A1* | 12/2014 | Pai | G06Q 30/0641 235/383 |
| 2015/0033876 A1* | 2/2015 | Krause | E05F 1/025 73/862.61 |
| 2015/0054959 A1* | 2/2015 | He | G06K 9/00523 348/150 |
| 2016/0026985 A1* | 1/2016 | Dubois | G07G 1/0045 705/16 |
| 2016/0292661 A1* | 10/2016 | Kwan | H04N 7/181 |
| 2016/0350738 A1* | 12/2016 | Crooks | G06Q 20/208 |
| 2017/0251183 A1* | 8/2017 | Crooks | G07G 1/0054 |
| 2018/0032990 A1* | 2/2018 | Costello | H04N 5/2257 |

* cited by examiner

FORCE LOCATION APPARATUS, SYSTEMS, AND METHODS

BACKGROUND INFORMATION

The equipment used by one retailer to complete the sale of merchandise in a physical store environment is often similar to or identical to that used by another. This includes the operation of self-checkout systems. In today's retail environment, equipment that can reduce operating cost and increase efficiency can frequently provide a competitive advantage.

SUMMARY

Various embodiments described herein include at least one of apparatus, systems, and methods that enable a scale to operate as a precise locator of applied force, as well as a device that weighs items during checkout operations. This dual-use of a single device can provide greater flexibility to a retailer, perhaps reducing operating cost and/or increasing operating efficiency.

One embodiment, in the form of a method, includes receiving measurements corresponding to a plurality of forces applied substantially simultaneously to a substantially planar, weight-bearing measurement surface. Additional activity includes determining a location on the surface, based on a combination of the measurements, of an equivalent force that corresponds to the combination of the measurements.

In another embodiment, an apparatus includes a scale having a substantially planar, weight-bearing measurement surface; and a processor to receive measurements corresponding to substantially simultaneous application of a plurality of forces to the surface, where the processor is to determine a location on the surface, based on a combination of the measurements, of an equivalent force that corresponds to the combination of the measurements.

A system embodiment includes a scale having a substantially planar, weight-bearing measurement surface; a processor to receive measurements from the scale, the measurements corresponding to substantially simultaneous application of a plurality of forces to the scale, and to determine a location on the scale, based on a combination of the measurements, of an equivalent force that corresponds to the combination of the measurements that exceed a selected threshold, and to transform the location into a command; and a barcode scanning device communicatively coupled to the processor, to receive the command. These and other embodiments will now be described in further detail.

DETAILED DESCRIPTION

To address the challenges noted above, as well as others, some embodiments operate to solve the technical problem of locating/identifying a product, and/or simplified data entry and communication by using a weighing device, such as a scale. This occurs by determining the location of force applied to the weight plate of the scale, making available additional information about activity that occurs during the checkout process. This additional information includes the location of products on the weight plate, as well as the location of temporarily applied forces (e.g., a force supplied by a user, when the scale surface is used as a key or touch pad). The availability of this information enables new functionality, without changing the physical relationship of checkout system components. The details of the innovative approach that is used to provide this functionality will be discussed in the following paragraphs.

In some embodiments, an item checkout/purchase system includes a scale that is used to measure the weight of produce and other items sold by weight. Typically, the weight measure is obtained using one or more load cells located beneath the weight plate. These load cells produce a voltage which is proportional to the force applied (i.e., the weight). For each load cell, the output voltage can be provided to an Analog-to-Digital Converter (ADC), to generate a digital value proportional to the weight measured by the cell. Multiple load cells provide multiple output voltages that can be combined directly, in an analog way (so that the total result can be digitized) or in a digital way, in which case the combination of values is done after each voltage has been converted to a digital value.

The analog output of multiple load cells coupled to a common weight plate can thus be digitized in parallel (e.g., using a corresponding multiple ADCs), or in series (e.g., using an analog multiplexer that feeds a single ADC), to obtain useful information. In either case, the conversion values provided by the load cells can be used to determine the location of a force applied to the weight plate. When a processor is coupled to one or more ADCs, that are in turn coupled to the load cells, either directly or indirectly (e.g., using a multiplexer), patterns of applied force can be captured. These patterns include basic location information, such as the centroid of a product on the weight plate, as well as signatures or key-stroke sequences on a virtual keyboard. The pattern information can be provided to other system components, including vision systems (e.g., the image and video streaming provided by the ScanWatch feature of an NCR RealScan™ 7879 Bi-Optic Imager available from NCR Corporation of Duluth, Ga.) to support algorithms that help prevent item substitution. In some embodiments, this implementation of a scale's weight deck as a touch device to determine an X-Y location of force applied to the deck provides new system functionality without adding to the physical components that make up a checkout system.

Figure 1:
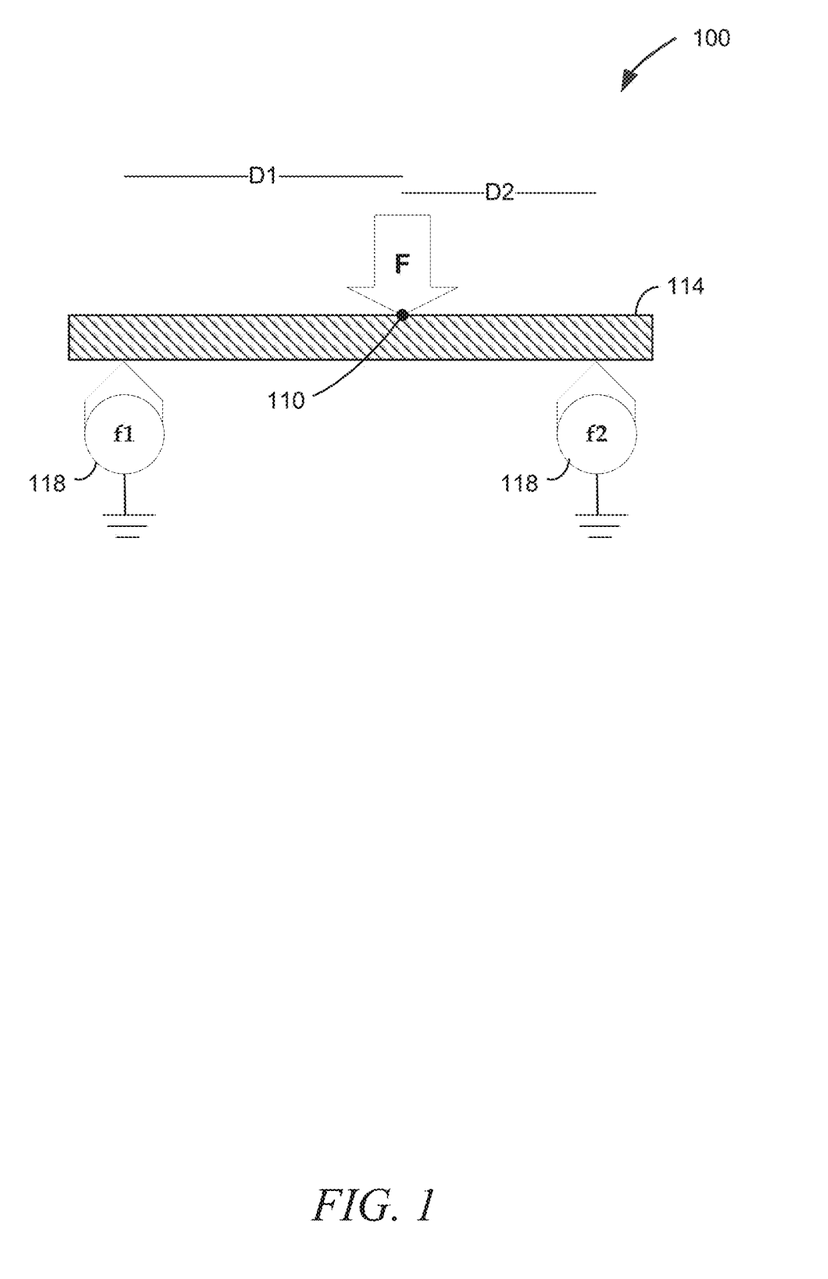
FIG. 1 is a block diagram illustrating the location a force along one dimension, according to an example embodiment.

FIG. 1 is a block diagram illustrating the location of a force F along one dimension, according to an example embodiment. Here, a force F is applied at certain point 110 along a bar 114, resting on two load cells 118 separated by a distance d1+d2. Since the one dimensional system 100 is in equilibrium, and the weight of the bar 114 can be neglected (e.g., it can be tared out before the force F is applied), the sum of forces detected at the two load cells 118 is equal to the total force F applied, or: $F=f_1+f_2$.

Furthermore, from momentum equilibrium, it is known that $d_1 F=(d_1+d_2)f_2$. Thus, $d_1$ can be computed as $$d_1 = D\frac{f_2}{F},$$

or equivalently, $$d_1 = D\frac{f_2}{f_1 + f_2}.$$

This means that the location of the force F can be determined by calculating the values of $f_1$ and $f_2$, which are provided by the load cells, and in turn, by the outputs circuitry of one or more ADCs, since the distance between the load cells 118 is known.

Figure 2:
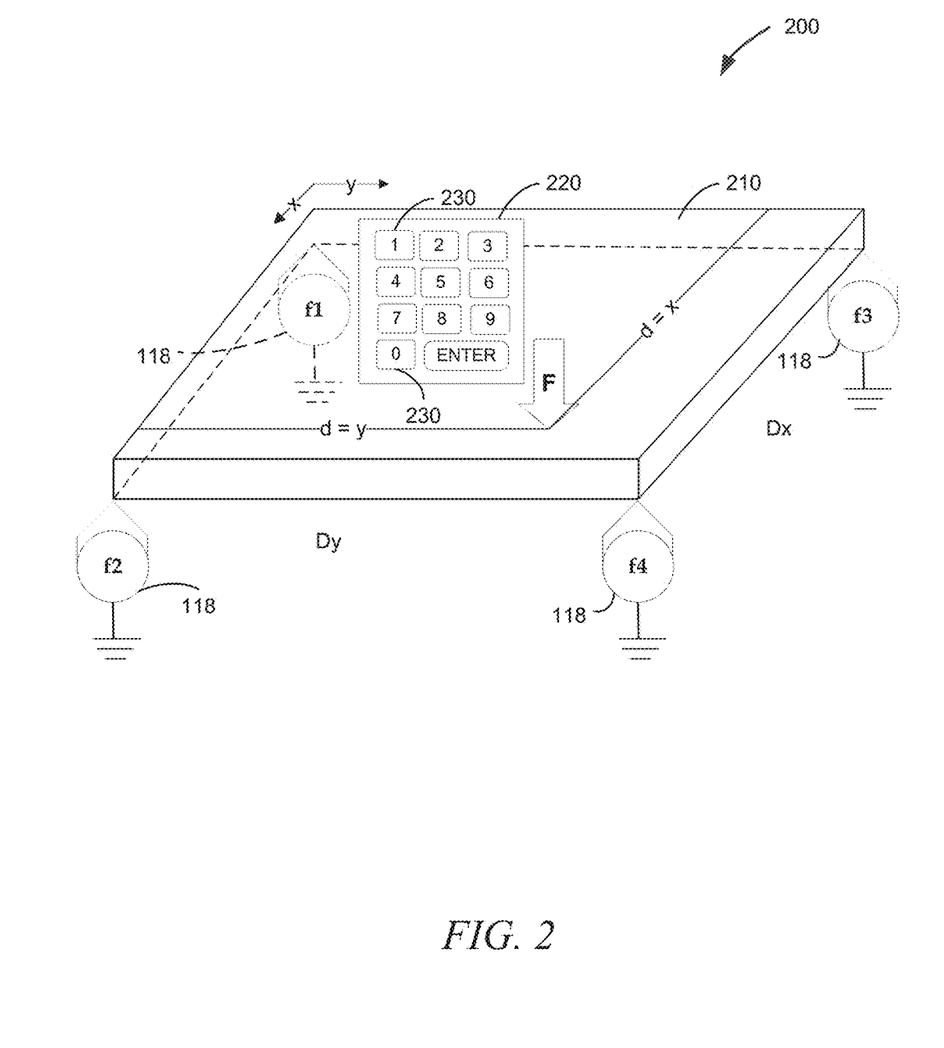
FIG. 2 is a block diagram of a scale, illustrating the location of a force along two dimensions, according to an example embodiment.

FIG. 2 is a block diagram of a scale 200, illustrating the location of a force F along two dimensions, according to an example embodiment. Here a weight plate is used to receive the force F, instead of a bar and, as was done in the one dimensional case, the weight of the weight bearing measurement surface (e.g., the weight plate) 210 is neglected. The four load cells 118 are positioned to form a rectangle, in this case, at the corners of the weight bearing measurement surface 210. However, this placement is optional—the load cells 118 may be placed in other locations for other embodiments.

For convenience, the load cell 118 used to measure f1 is placed at the origin of an X-Y plane that includes the weight bearing measurement surface 210. The force F is applied at a position (x,y) relative to the origin. $D_x$ and $D_y$ are the distances between the load cells 118 along the X axis and Y axes, respectively.

By working in pairs, the calculations derived for the one dimensional case of FIG. 1 can be used to determine the location (x,y) of the applied force F in terms of coordinates of the output of the forces (e.g., weights) detected by each of the load cells 118.

Since it is known that $F=f_1+f_2+f_3+f_4$, Equations (1) and (2) can be established by simple substitution:

$$x = D_x \frac{f_2 + f_4}{F} \quad (1)$$

and $$y = D_y \frac{f_3 + f_4}{F}. \quad (2)$$

These Equations (1) and (2) can be used to determine the location (x,y) at which the force F is applied to the weight bearing measurement surface 210. In some embodiments, one or more of the forces f1, f2, f3, f4 is measured and discarded unless it meets a selected minimum threshold, to preclude the influence of noise on the location of the force F. In some embodiments, the scale 200 is integrated into a scanner system (e.g., see FIG. 3), so that the location (x, y) can be displayed on a terminal. This capability can be implemented using the components that already exist within the scanner system, so that additional components are not needed. Thus, many embodiments can be realized.

For example, in some embodiments, the weight bearing measurement surface 210 can be made to emulate a keypad, so that a user could enter key programming sequences by pressing on the surface 210 in predetermined positions, such as individual locations marked out by printing, an overlay, or other indicia 220 located on the surface 210.

In one example, a printout (e.g., one possible form of the indicia 220) of the desired keys that will be used are placed on the surface 210, in a predetermined position. The scale 200 is then turned on and the scale-zero button is depressed for some number of seconds to get into a "Programming Mode" for the scale 200. Then individual "keys" (e.g., specific enumerated locations 230 marked out on the indicia 220) can be pressed to operate a virtual keyboard created on the surface 210 by the indicia 220 to enter a desired sequence of commands, digits, alphanumeric characters, etc. This sequence can be terminated by an "ENTER" key, or timed, or in some other manner to program the scale 200, or some other component of an interconnected system.

Similarly, in some embodiments, the weight bearing measurement surface 210 can be made to emulate a touchpad, so that forces applied to the surface 210 and periodic measurements made by the load cells 118 can be used to capture signatures and other patterns of force that become a part of transactions enabled by the scale 200. To capture a signature or a pattern using the surface 210, an audio command can be issued to the user by the system, to initiate movement. As the signature/pattern is impressed on the surface 210, the location of the force F is captured several times each second. Once the signature/pattern is complete, the user may press a termination button (e.g., the scale-zero button, or an "ENTER" location on the surface 210). After the signature/pattern is digitized and parsed, an image of the entry can be formed and sent to a terminal for further processing.

In some embodiments, the approximate location (x,y) of the centroid of an item located on the surface 210 can provide auxiliary information to system modules, including vision system modules (e.g., the ScanWatch vision system) to determine the probability of item substitution (e.g., due to the fraudulent exchange of items on the scale) or the presence of an item at a given position that can be used to influence the analysis and adjustment (e.g., start/stop) of conveyor belt operation.

In one example, an item is placed on the surface 210 and a delay time period of a few seconds is entered to ensure the force applied to the surface by the item is stable. At this point, a ScanWatch video system operates to provide images of the item, and the approximate location (x,y) of the item centroid is determined, and transmitted to the ScanWatch video system. The ScanWatch video system, in turn, operates to determine the nature of the item (e.g., produce, or manufactured) using the image that locates the item on the surface 210, the location of the centroid, and the magnitude of the force F.

In another example, a belt suppressor analysis algorithm operates to determine that an item may be close to the edge of the surface 210, or near a corner or other undesired location on the surface 210. When the belt suppressor analysis algorithm issues a request for further information, the location (x,y) of the item can be provided to the algorithm once the existence of a stable amount of force F is determined. Then the algorithm can use the determined location (x,y) to confirm or reject initial indications about the item's location.

In some embodiments, a system that provides optical, wireless, or some other indication of an error during operations, based on the location (x,y) of the force F and/or a pattern/signature captured by the surface 210 and load cells 118 comprises an NCR RealScan™ 7879 Bi-Optic Imager communicatively coupled a scale 200. This system can operate as a POS checkout device, with a POS terminal, printer, keyboard, display, magnetic stripe reader (MSR), and POS software. Thus, many embodiments may be realized.

Figure 3:
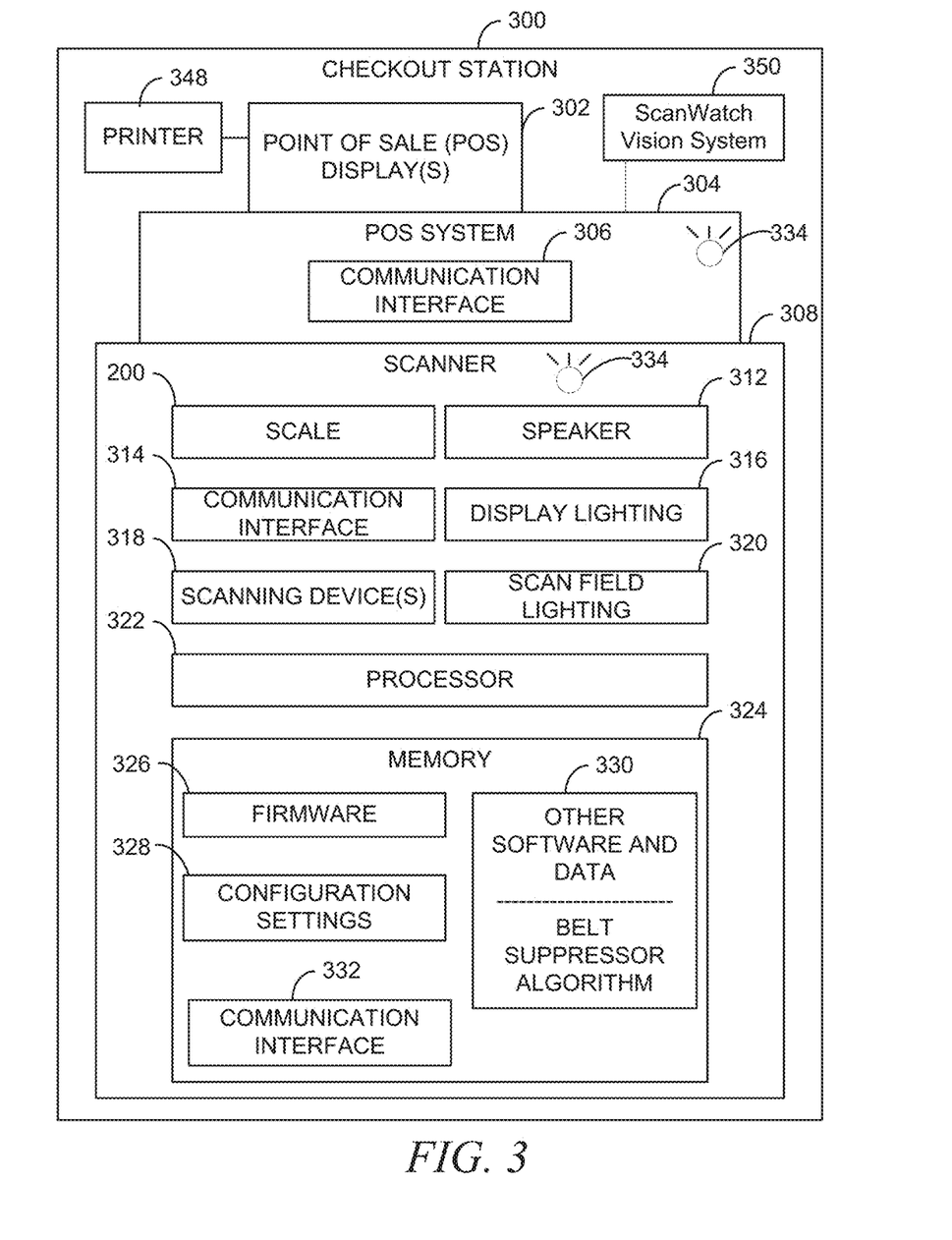
FIG. 3 is a block diagram of a checkout station that includes a scale, according to an example embodiment.

For example, FIG. 3 is a block diagram of a checkout station 300 that includes a scale 200, according to an example embodiment. It is noted that the checkout station 300 is shown schematically in greatly simplified form, with example components relevant to understanding the various embodiments described herein. This simplification is also in effect for components of the scale 200. Thus, the checkout station 300 and scale 200 may include more or less components in some embodiments.

Examples of other terminal types that may include a scanner 308 are self-service terminals (SSTs), clerk operated and self-service library checkout stations, time-keeping terminals, Pay-at-the-Pump terminals attached to a fuel pump at a fueling station, and the like.

The methods of some embodiments are programmed as executable instructions in memory and/or non-transitory computer-readable storage media and executed on one or more processors and other such data processing devices associated with the components and devices herein. Thus, in some embodiments, a non-transitory machine-readable storage device comprises instructions stored thereon, which, when performed by a machine, cause the machine to become a customized, particular machine that performs operations comprising one or more features similar to or identical to those described with respect to the methods and techniques described herein. A machine-readable storage device, herein, is a physical device that stores information (e.g., instructions, data), which when stored, alters the physical structure of the device. Examples of machine-readable storage devices can include, but are not limited to, memory in the form of read only memory (ROM), random access memory (RAM), a magnetic disk storage device, an optical storage device, a flash memory, and other electronic, magnetic, or optical memory devices, including combinations thereof.

The physical structure of stored instructions in the memory 324 may be operated on by one or more processors such as, for example, the processor 322. Operating on these physical structures can cause the machine to become a specialized machine that performs operations according to methods described herein.

The checkout station 300 includes one or more POS displays 302 that present information of a POS system 304 coupled to the one or more POS displays. Information presented by the one or more POS displays includes information relevant in a retail context and with regard to operation of the checkout station 300, and the scale 200. The checkout station 300 also includes one or more scanners 308.

The scanner 308 may be referred to as a barcode scanner as that is the task most commonly associated with such devices. An example of such a barcode scanner is the NCR RealScan™ 7879 Bi-Optic Imager. During operation of the checkout station 300, items are placed within a scan field of the scanner 308. The items may be placed on the scale 200, so that the location (x,y) of the force F can be determined while the item is scanned.

One or more scanning devices 318 of the scanner 308, such as one or more of a camera and a laser scanner then scan a barcode and information read therefrom (including the location (x,y) and amount of the force F) is communicated to the POS system 304. The POS system 304 then uses that data to identify the item placed within the scan field of the scanner 308 and performs additional functions. The additional functions may include a price lookup and addition of the item to a list of items to be purchased, which may be presented on the one or more POS displays 302.

The scanner 308 may include one or more scan fields, such as two scan fields of bi-optic scanners that are in use in grocery and discount retail outlets, and well known to those of ordinary skill in the art. In addition to the scanning devices 318, the scanner 308 may include various other components. The various other components may include, as noted previously, an integrated scale 200 to weigh produce and other items, and one or both of a speaker 312 and display lighting 316 to output audio and visual signals such as signals indicating successful and/or unsuccessful scans. The scanner 308 may also include scan field lighting 320 that may be turned on and off and adjusted based on a detected presence of an item to be scanned.

During operation, the scanner 308 functions according to instructions executed on a processor 322. The processor 322 may comprise an application integrated circuit (ASIC), a digital signal processor, a microprocessor, or another type of processor. The instructions may comprise firmware 326 or software 330 (e.g., belt suppressor algorithms realized as a series of instructions) stored in one or more memories 324. The one or more memories 324 may comprise volatile and/or non-volatile memories, write-protected memories, write-once memories, RAM, ROM, and other memory and data storage types and devices.

The instructions stored in firmware 326 and/or as software 330 in memory 324 are executed according configuration settings stored in the memory 324. The configuration settings 328 configure operation of the scanner 308, and various components, both hardware and software, therein. For example, the configuration settings 308 may operate to configure the volume of the speaker 312, display lighting 316 operation, brightness of the scan field lighting 320, selection of a decoding algorithm for the scanning device(s) 318, and the selection of one or more communication protocols used to communicate data from the scanner 308 to the POS system 304, via a wired or wireless communication interface 306 of the POS system 304 to a physical communication interface device 314 or virtualized communication interface 332 of the scanner 308. For example, in some embodiments, the communication interface 306 of the POS system 304 is accessible from the scanner 308 as a virtualized communication interface 332 maintained in the memory 324 by a process that executes on the processor 322. Each of the communication interfaces 306, 314 may comprise wired or wireless communication interface devices, such as a wired Ethernet device, a wireless Ethernet device (e.g., a device capable of communicating according to one or more of the 802.11 standards), a Bluetooth® communication device, a mesh network device or other peer-to-peer type networking device, a mobile network data communication device, and the like.

In some embodiments, during the operation of the station 300 or the scanner 308, or any of the other elements shown in the figure, an error condition arises. This may be the result of equipment malfunction, failure to scan, a lack of paper in the printer 348, an over- or under-weight condition associated with the scale 200, etc. The individual element involved, such as the scanner 308, the POS system 304, or the station 300 may operate to indicate the existence of the error. Such existence may be indicated by a blinking LED 334. Alternatively, or in addition, the error condition might be indicated by a tone or series of tones, emitted by the speaker 312, by a wireless communication sequence (e.g., provided via the communication interface 314), or perhaps as an error message on a display, such as the display(s) 302.

In some embodiments, the POS system 304 is communicatively coupled to a ScanWatch vision system 350.

In some embodiments, the software 330 stored in memory 324 includes instructions executable on the processor 322 to automatically set the configuration settings 328, such as upon scanner 308 installation, completion of scanner 308 maintenance, or other times with regard to the scanner 308. In some embodiments, the software 330 stored in the memory 324 includes instructions executable by the processor 322 to operate the LED 334, speaker 312, communications interface 332 (e.g., to transmit and receive wireless communication), and/or display(s) 302 to indicate an error condition that can be recognized by the portable apparatus 350.

In some embodiments, a group of scanners 308 deployed on a network may share a database accessible via a network by communication interfaces 314 of the respective scanners 308. In other embodiments, the various scanners 308 may synchronize their local databases among each other in a Peer-to-Peer (P2P) manner or via a network service or shared database accessible via the network. Thus, a local database, or another database as described herein, that stores data may be take different forms and store different data (e.g., rules and records of instructions) in various embodiments.

Figure 4:
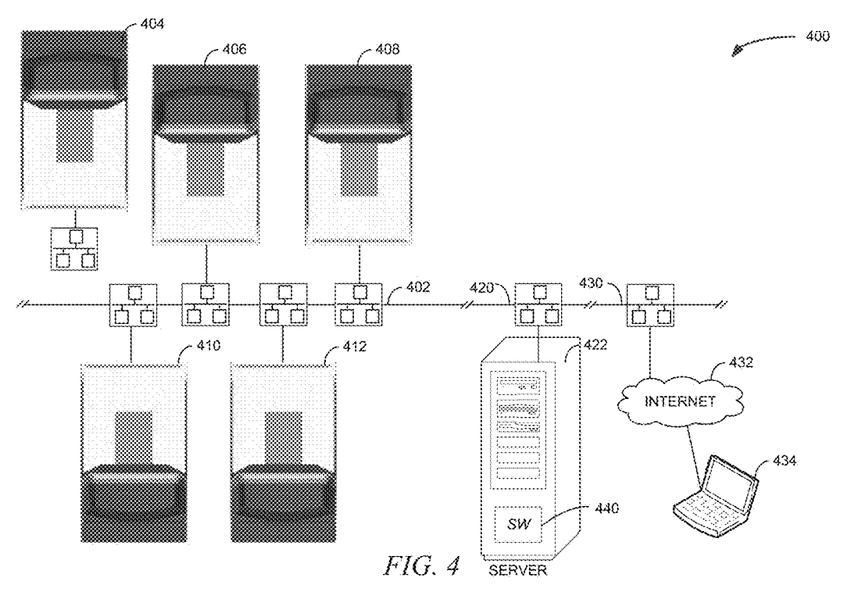
FIG. 4 is block diagram of networked system components, according an example embodiment.

FIG. 4 is block diagram of networked system 400 components, according an example embodiment. The system 400 is a view of a networked system including scanners or Self Service Terminals 406, 408, 410, 412 connected to a network segment 402. The network segment 402 may be a stand-alone network, such as a network within a retail outlet. The network segment 402 may also be part of a larger network that includes additional network segments 420, 430. For example, the network segment 402 may be a store-based network that is also coupled a corporate network segment 420. The corporate network segment 420 may further be coupled to a global network, such as the Internet 432 via network segment 430.

The network segment 402 includes the plurality of scanners or Self Service Terminals (SSTs) 406, 408, 410, 412 connected thereto. The system 400 also includes a scanner/SST 404 that has not yet been connected to the network segment 402. In some embodiments, once the scanner/SST 404 is connected to the network segment 402, a configuration process will execute within the scanner/SST to automatically set its configuration. This may include discovering its configuration through communication with one or more of the other scanners/SSTs 406, 408, 410, 412, requesting configuration setting data from a server 422 that may be accessible via the network segment 402, the corporate segment network 420, the network segment 430, and/or the Internet 432. These configuration settings may include data to be stored on the scanner 404/SST as a local database of data, which may include barcode data, error data, training data, and software update data. Further, the configuration settings may also be pushed to, or otherwise remotely sent to the scanner/SST 404, or to other scanners/SSTs 406, 408, 410, 412 from the server or from a computing device 434 that may be connected to the Internet 434, the corporate network segment 420, or the network segment 402 via an interface of the scanners/SSTs 404, 406, 408, 410, 412 as discussed above. In some embodiments, local databases of data stored in the memories of the scanners/SSTs 404, 406, 408, 410, 412 maybe synchronized via one or more of the network segments 402, 420, 430 via P2P processes that execute on the scanners/SSTs 404, 406, 408, 410, 412, via a process on the server 422, or otherwise. In some embodiments, a software (SW) update database 440 may be located on a server 422.

The scanners/SSTs 404, 406, 408, 410, 412 may be similar to or identical to the scanner 308 shown in FIG. 3, or parts of, or even the entire station 300 shown in FIG. 3. Thus, although not illustrated, the scanners 406, 408, 410, 412 may be coupled to terminals, such a POS terminals, self-service kiosks and/or terminals, and the other types of terminals discussed elsewhere herein (e.g., POS system 304 and checkout station 300 of FIG. 3).

Therefore, as will become apparent to those of ordinary skill in the art, after reviewing this document and FIG. 4, some embodiments can implement the functions described herein as part of the activity of two or more specific interconnected hardware modules or devices with related control and data signals. These control and data signals may be communicated between and through the modules, or as portions of an application-specific integrated circuit. Thus, the example process flow that follows is applicable to software, firmware, and hardware implementations.

Figure 5:
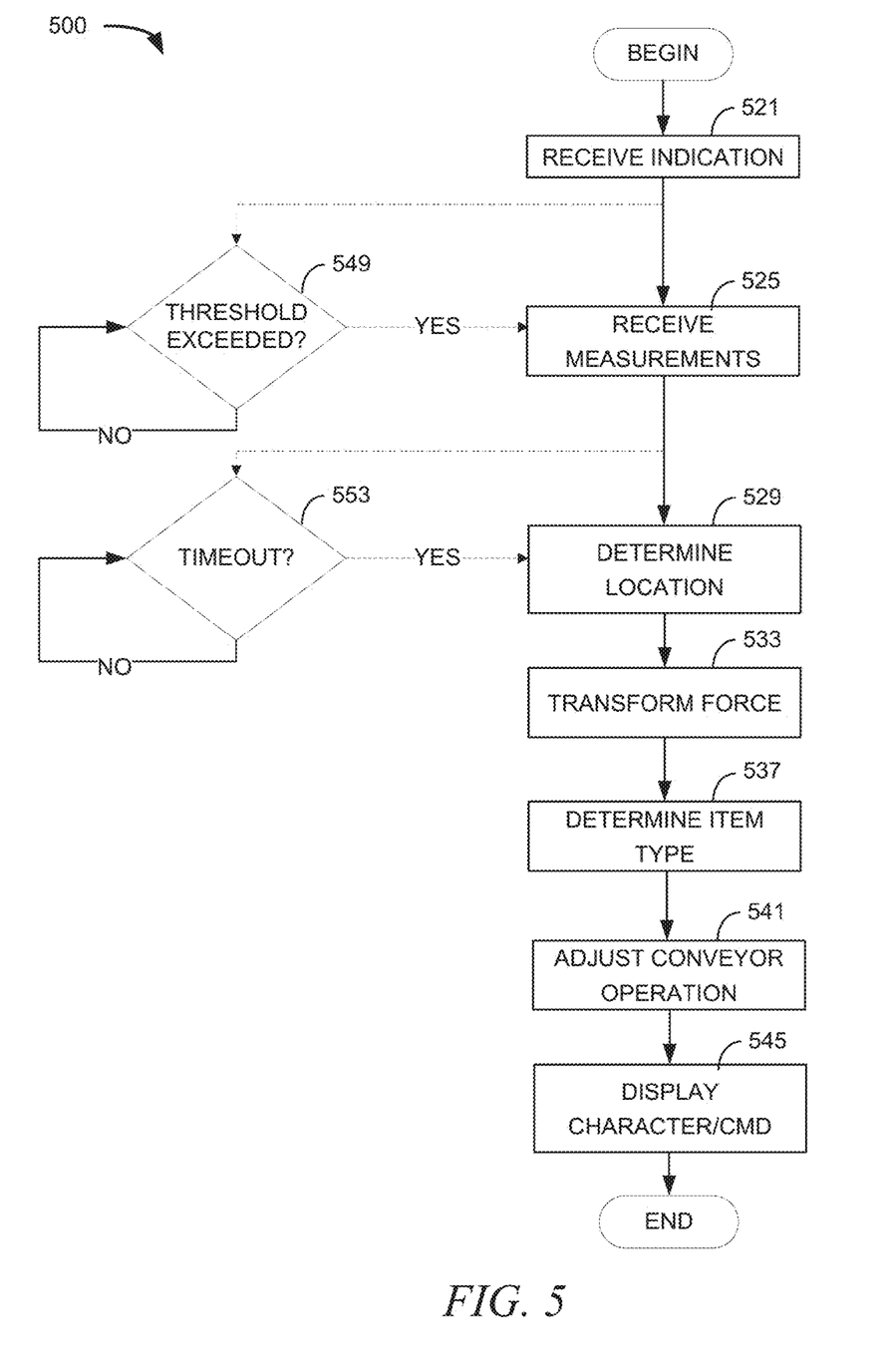
FIG. 5 is a flow diagram of a method, according to an example embodiment.

FIG. 5 is a flow diagram of a method 500, according to an example embodiment. The method 500 is an example of a method that may be performed on the scale 200 of FIG. 2 and/or the station 300 or scanner 308 of FIG. 2 that includes a memory to store instructions that may be executed to perform the method.

In some embodiments, a method 500 comprises receiving measurements corresponding to a plurality of forces sensed at a weight-bearing measurement surface at block 525, and converted into an equivalent force applied at a location on the surface at block 529.

An initial touch (or pattern of touches, such as a double- or triple-tap) can be applied to the surface of the scale, perhaps at a specific location on a key overlay, or a button can be pressed, or a voice command can be given, to provide an indication to the system that character/command entry or signature entry will commence within a short period of time. Thus, in some embodiments, the method 500 begins at block 521 with receiving an indication that application of a plurality of forces is imminent.

When force is applied to the surface, the determination of an equivalent location may commence after a selected weight threshold is exceeded, to help exclude noise. Thus, in some embodiments, determining the location of the equivalent force (e.g., at block 529) commences after the combination of measurements exceed a selected threshold at block 549.

In some embodiments, the method 500 may continue on to block 525 to include receiving measurements corresponding to the plurality of forces sensed substantially simultaneously at a substantially planar, weight-bearing measurement surface. For example, load cells coupled to the surface may supply the measurements. Thus, the measurements may be received from load cells mechanically coupled to the surface.

For the purposes of this document "substantially simultaneously" means that the measurements of force at various point on the surface by load cells, strain gauges, and other mechanisms, are made at approximately the same time. For example, measurements can be made substantially simultaneously when they are made during the period of time that extends from the point in time an item is placed on the surface, until the point in time when it is removed from the surface. In another example, measurements can be made substantially simultaneously when they are made during the period of time that extends from the point in time a finger is used to depress an overlay location on the surface, until the point in time when the pressure from the finger is removed from the surface. In each case, the measurement operation might include digitizing the output of all load cells or other mechanisms used to measure the application of force at various points on the surface within 100, or 200, or 500 milliseconds. In some embodiments, multiple acquisition cycles may occur within these time periods, to determine whether the application of force is stable, or noisy.

In some embodiments, the measurements are received as part of the activity at block 525, until a timeout period expires, as determined at block 553. Thus, the method 500 may include, at block 553, receiving the application of a plurality of forces during a selected amount of time after the indication (that the application of force is imminent) is received.

In some embodiments, the method 500 continues on to block 529 to include determining a location on the surface, based on a combination of the measurements, of an equivalent force that corresponds to the combination of the measurements.

The location can be specified by coordinates in a plane. Thus, in some embodiments, the location comprises coordinates in a plane that includes the surface.

The equivalent force might comprise a set of entries, to be interpreted as a series of keystrokes, characters, or commands. Thus, the method 500 may include, at block 553 transforming the equivalent force comprising a series of disconnected entries into a corresponding series of characters, keystrokes, or commands.

The equivalent force might also comprise a more or less continuous entry, to be interpreted as a signature. For example, continuous conversion of the equivalent force might be used over time to create an image. Thus, the activity at block 553 may comprise transforming the equivalent force into a signature, using substantially continuous conversion of the equivalent force.

The type of item placed on the surface may be determined using a combination of the location, the equivalent force, and an image. Thus, in some embodiments, the method 500 includes, at block 537, determining an item type corresponding to the location associated with the equivalent force, and an image of an item acquired after application of the plurality of forces is determined to be substantially stable.

For example, the item type may be produce, or a manufactured item, such as hardware. Thus, in some embodiments, the item type comprises at least one of "produce" or "manufactured".

The equivalent location can be used to interact with the operation of a conveyor belt. Thus, in some embodiments, the method 500 continues on to include, at block 541, adjusting operation of a conveyor belt in response to determining, based on the location, that an item is not correctly placed on the surface.

An overlay, displayed, projected, or real, can be used to designate areas of the surface that can be activated to provide communication between an operator and a scanning system, or some other system coupled to the scale. Thus, some embodiments of the method 500 include, at block 545, displaying an alphanumeric character or a device programming command corresponding to the location of indicia associated with areas on an overlay displayed by, projected on, printed on, or laid upon, the surface.

For example, the overlay may comprise a keypad printed onto a sheet of material that is laid upon the surface. Thus, in some embodiments, the overlay comprises a sheet of material that includes an image of a keypad. Many other embodiments may be realized.

For example, another embodiment takes the form of an apparatus. Thus, referring now to FIGS. 2-4, an apparatus may comprise a scale 200 and a processor 322 to convert multiple, simultaneous measurements into an equivalent force at a location on the scale measurement surface 210.

In some embodiments, an apparatus comprises a scale 200 having a substantially planar, weight-bearing measurement surface 210. The apparatus may further comprise a processor 322 to receive measurements corresponding to substantially simultaneous sensing of a plurality of forces at the surface 210, and to determine a location (x,y) on the surface 210, based on a combination of the measurements, of an equivalent force F that corresponds to the combination of the measurements.

A display can be used to present characters corresponding to the application of force. Thus, in some embodiments, the apparatus comprises a display 302 communicatively coupled to the processor 322, to display one or more characters corresponding to the location.

The processor may be coupled to a network interface, including a wireless interface, to transmit the location as commands, such as commands for a scanner. Thus, in some embodiments, the apparatus comprises a network interface 332 to couple the processor 322 to a scanner 318, to transmit the location of the equivalent force F to the scanner 318, wherein the location corresponds to at least a portion of a programming command for the scanner 318.

A camera can be used in conjunction with the scale, forming images when the application of force reaches a predetermined value. Thus, in some embodiments, an apparatus may further comprise a camera (e.g., as part of a ScanWatch Vision System 350) to form an image of an object in contact with the surface 210, wherein formation of the image is initiated when the measurements exceed a predetermined value.

The weight-bearing surface may comprise a plate on a scale that is supported by load cells. Thus, in many embodiments, the apparatus comprises load cells 118 mechanically coupled to a plate forming the surface 210, to provide the measurements when the plurality of forces are sensed at the surface 210.

Some embodiments take the form of a system. For example, a system may comprise a scale 200, a processor 322, and a barcode scanner 318 that receives commands that are entered via the surface 210 on the scale 200. Thus, a system may comprise a scale 200 having a substantially planar, weight-bearing measurement surface 210, and a processor 322 to receive measurements from the scale 200, the measurements corresponding to substantially simultaneous sensing of a plurality of forces at the surface 210, and to determine a location on the surface 210, based on a combination of the measurements, of an equivalent force F that corresponds to the combination of the measurements that exceed a selected threshold, and to transform the location into a command. The system may further comprise a barcode scanning device 318 communicatively coupled to the processor 322, to receive the command.

The scanning device might be part of a Self-Service Terminal. Thus, in some embodiments, the scanning device forms a part of the system that comprises a Self-Service Terminal (SST).

The SST might be part of a Point-Of-Sale system. Thus, in some embodiments, the SST comprises a self-checkout Point-Of-Sale (POS) system. Many other embodiments may be realized, but are not explicitly described here in the interest of simplicity and brevity.

In summary, various embodiments enhance the value of services provided to retailers and consumers alike, by providing a scale that can be used to weigh individual items, as well as to identify them by the approximate location of their centroid, and/or to acquire information via character, command, or signature entry.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   receiving, by a computing device, data of measurements corresponding to a plurality of forces sensed substantially simultaneously at a substantially planar, weight-bearing measurement surface, each of the forces sensed by a load cell of a plurality of load cells located beneath the weight-bearing measurement surface, each load cell measuring a force applied local thereto, a combination of the forces sensed by the load cells being a total force applied to the weigh-bearing measurement surface;
   determining, by the computing device processing the data of the measurements, a location and patterns of applied force on the surface, based on individual load cell measurements and a combination of the measurements, of an equivalent force that corresponds to the combination of the measurements;
   determining, by the computing device, an item type corresponding to the location and pattern of applied force and a probability of item substitution fraud;
   adjusting operation of a conveyor belt in response to determining, based on the location, that an item is not correctly placed on the surface based on forces sensed by the load bearing cells; and
   adjusting operation of the conveyor belt in response to determining, based on the location, that an unacceptable probability of item substitution fraud based on forces sensed by the load bearing cells.

2. The method of claim 1, wherein the measurements are received from load cells mechanically coupled to the surface.

3. The method of claim 1, wherein the location comprises coordinates in a plane that includes the surface.

4. The method of claim 1, further comprising:
   determining the item type further corresponding to an image of an item acquired after application of the plurality of forces is determined to be substantially stable.

5. The method of claim 4, wherein the item type comprises at least one of produce or hardware.

6. The method of claim 1, further comprising:
   receiving an indication that application of the plurality of forces is imminent; and
   receiving the application during a selected amount of time after the indication is received.

7. The method of claim 6, further comprising:
   transforming the equivalent force comprising a series of disconnected entries into a corresponding series of characters, keystrokes, or commands.

8. The method of claim 6, further comprising:
   transforming the equivalent force into a signature, using substantially continuous conversion of the equivalent force.

9. The method of claim 1, further comprising:
   displaying an alphanumeric character or a device programming command corresponding to the location associated with areas on an overlay displayed by, projected on, printed on, or laid upon, the surface.

10. The method of claim 9, wherein the overlay comprises a sheet of material that includes an image of a keypad.

11. The method of claim 1, wherein determining the location of the equivalent force commences after the combination of measurements exceed a selected threshold.

12. An apparatus, comprising:
   a conveyor belt;
   a scale having a substantially planar, weight-bearing measurement surface that senses forces applied thereto by a plurality of load cells located beneath the weight-bearing measurement surface, each load cell measuring a force applied local thereto and each load cell outputting data representing a weight measurement sensed thereby, a combination of the forces sensed by the load cells being a total force applied to the weigh-bearing measurement surface; and
   a processor to receive load cell data of measurements corresponding to substantially simultaneous sensing of a plurality of forces at the surface, and to determine a location and at least one pattern of applied force on the surface, based on individual load cell measurements and a combination of the measurements, of an equivalent force that corresponds to the combination of the measurements and an item type corresponding to the location and pattern of applied force, and to:
   adjust operation of the conveyor belt in response to determining, based on the location, that an item is not correctly placed on the surface; and
   adjust operation of the conveyor belt in response to determining, based on the location, that an unacceptable probability of item substitution fraud based on forces sensed by the load bearing cells.

13. The apparatus of claim 12, further comprising:
a display communicatively coupled to the processor, to display one or more characters corresponding to the location.

14. The apparatus of claim 12, further comprising:
a network interface to couple the processor to a scanner, to transmit the location of the equivalent force application to the scanner, wherein the location corresponds to at least a portion of a programming command for the scanner.

15. The apparatus of claim 12, further comprising:
a camera to form an image of an object in contact with the surface, wherein formation of the image is initiated when the measurements exceed a predetermined value.

16. The apparatus of claim 12, wherein the scale comprises:
   load cells mechanically coupled to a plate forming the surface, to provide the measurements when the plurality of forces are applied to the surface.

17. A system, comprising:
   a conveyor belt apparatus;
   a scale having a substantially planar, weight-bearing measurement surface that senses forces applied thereto by a plurality of load cells located beneath the weight-bearing measurement surface, each load cell measuring a force applied local thereto and each load cell outputting data representing a weight measurement sensed thereby, a combination of the forces sensed by the load cells being a total force applied to the weigh-bearing measurement surface;
   a processor to receive load cell data of measurements from the scale, the measurements corresponding to substantially simultaneous sensing of a plurality of forces at the surface, and to determine a location and a pattern of applied force on the surface, based on individual load cell measurements and a combination of the measurements, of an equivalent force that corresponds to the combination of the measurements that exceed a selected threshold and a matching pattern to the pattern of applied force, and to transform the location into a command, and to:
      adjust operation of the conveyor belt in response to determining, based on the location, that an item is not correctly placed on the surface; and
      adjust operation of the conveyor belt in response to determining, based on the location, that an unacceptable probability of item substitution fraud based on forces sensed by the load bearing cells; and
   a barcode scanning device communicatively coupled to the processor, to receive the command.

18. The system of claim 17, wherein the scanning device forms a part of the system that comprises a Self-Service Terminal (SST).

19. The system of claim 18, wherein the SST comprises a self-checkout Point-Of-Sale (POS) system.

* * * * *